United States Patent [19]

Moslo

[11] 3,718,209
[45] Feb. 27, 1973

[54] LUBRICATING MECHANISM

[76] Inventor: Ernest P. Moslo, 12700 Lake Avenue, Lakewood, Ohio 44107

[22] Filed: Dec. 10, 1970

[21] Appl. No.: 96,722

[52] U.S. Cl. ........................ 184/5, 184/100, 308/5, 308/36.1
[51] Int. Cl. .......................... F16n 1/00, F16c 33/72
[58] Field of Search ....... 184/5, 100; 308/5, 36, 36.1, 308/122

[56] References Cited

UNITED STATES PATENTS

| | | | |
|---|---|---|---|
| 3,372,417 | 3/1968 | Devine | 308/36.1 X |
| 3,294,456 | 12/1966 | Williams et al. | 308/36.1 |
| 3,510,177 | 5/1970 | Shimula | 308/36.1 |
| 2,884,269 | 4/1959 | Reinke et al. | 308/36.1 X |
| 3,351,392 | 11/1967 | Powell | 308/5 R |
| 2,411,391 | 11/1946 | Robaczynski | 184/5 |
| 2,776,173 | 1/1957 | Rudy | 308/5 R |
| 2,908,177 | 10/1959 | Powell | 308/5 R X |

Primary Examiner—Manuel A. Antonakas
Attorney—Baldwin, Egan, Walling & Fetzer

[57] ABSTRACT

A lubricating mechanism for lubricating relatively movable members which are movable linearly relative to one another, and comprising a recess or chamber formed in one of the members and opening onto the other of the members, with bearing means arranged between the members and defining in part the chamber, and sealing means coacting with the bearing means for sealing a lubricant in the bearing means and in the chamber. A passageway communicates with the chamber and extends to the exterior of the movable member for inserting the lubricant, into the chamber. Another passageway communicates with the chamber to exteriorly of the movable member and is closed by removable means so that old lubricant can be forced out of the recess and replaced by new lubricant when and if so desired. The bearing means comprises spaced bearings with the lubricant chamber disposed intermediate the bearings, and with the length of the chamber being at least approximately one and one half times the effective length of one bearing. The arrangement is such so as to provide a substantially maintenance free, long service life lubricating mechanism for machine components, and is especially useful in connection with injection molding machines, although it may also be readily used in other types of machines.

13 Claims, 2 Drawing Figures

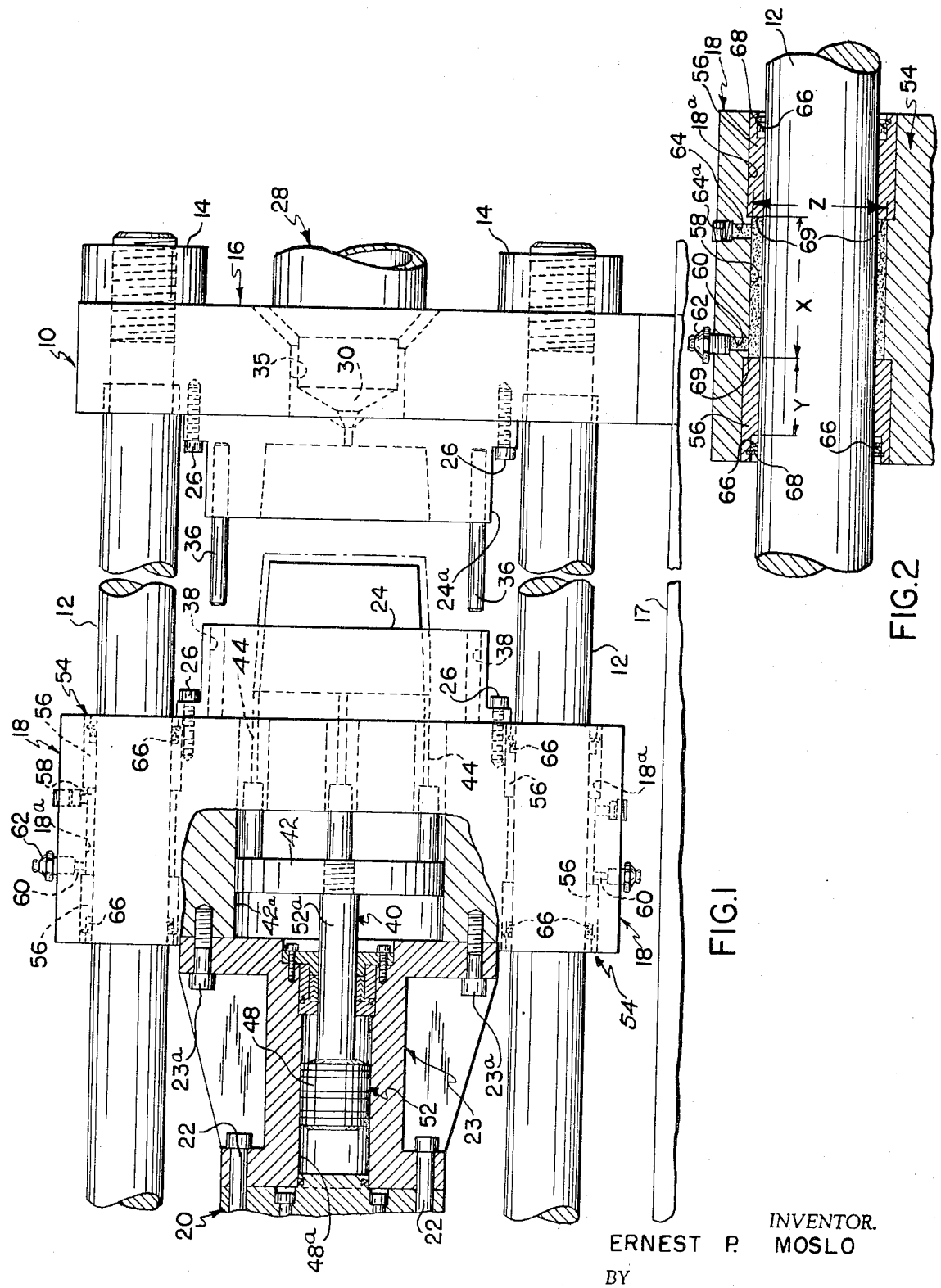

LUBRICATING MECHANISM

This invention relates to lubricating mechanism and more particularly a lubricating mechanism for lubricating relatively linearly movable parts of a machine involving sliding friction, and a lubricating mechanism that requires practically no maintenance and has long service life characteristics.

BACKGROUND OF THE INVENTION

Lubricating mechanisms for lubricating relative linearly movable components of machines are well known in the art. However, in such mechanisms, considerable supervision and attention must be given thereto in order to maintain them effective. Many such prior art mechanisms utilize liquid lubricants such as oils for lubricating purposes, and the latter usually require frequent replacement of the oil as it is used in the lubricating function. Moreover, many prior art systems are automatic or semi-automatic of the intermittent lubricating type, often times resulting in either over lubrication or under lubrication of the involved parts.

SUMMARY OF THE INVENTION

The present invention provides a lubricating mechanism which utilizes a soft solid type lubricant, such as grease, or a relatively heavy liquid lubricant, for lubricating relative linearly movable parts of a machine, and wherein the mechanism comprises a chamber or recess formed in one of the members and opening onto the other member with bearing means partially defining the recess, and sealing means coacting with the bearing means for maintaining the lubricant in the lubricant recess and in the bearings, and operative for wiping the relatively stationary supporting member dry upon movement of the movable member. The mechanism includes means communicating with the lubricant recess for insertion of the lubricant into the recess. The arrangement is such that once installed, the lubricating mechanism is maintenance free for a long period of time, and is highly efficient for lubricating the relative movable parts.

Accordingly, an object of the invention is to provide a novel lubricating mechanism for relatively linearly movable parts of a machine.

Another object of the invention is to provide a novel lubricating mechanism which utilizes soft solid lubricant and which is relatively maintenance free and possesses a long service life.

A still further object of the invention is to provide a mechanism of the above described type which comprises a relatively large recess or chamber formed in one of the relatively movable parts to be lubricated and is defined in part by spaced sleeve-type bearings which coact with sealing means for maintaining the lubricant in the bearings and in the chamber, and for wiping dry the stationary supporting member of the pair of relatively movable members during movement of the movable member, and wherein passageway means communicates the chamber or recess with the exterior of the movable member for inserting lubricant into recess.

A still further object of the invention is to provide a lubricating mechanism which is effective in operation, is maintenance free, and which when once installed provides a trouble free lubricating function for a long period of time to relatively linearly movable parts of a machine.

Other objects and advantages of the invention will be apparent from the following description taken in conjunction with the accompanying drawings, wherein:

BRIEF DESCRIPTION OF THE DRAWINGS

FIG. 1 is a fragmentary, partially broken, elevational view of a machine and more particularly an injection molding machine, embodying the lubricating mechanism of the invention; and FIG. 2 is an enlarged, fragmentary sectional illustration of the lubricating mechanism shown in FIG. 1.

DESCRIPTION OF THE PREFERRED EMBODIMENTS

Referring now again to the drawings, there is illustrated in FIG. 1, a fragmentary portion of an injection molding machine 10 comprising tie rods 12 of cylindrical configuration in cross section, anchored as at 14 to stationary platen 16, the latter being mounted on bed 17. A movable platen 18 having openings 18a therethrough is mounted on the tie rods 12 for linear sliding movement with respect to the guiding tie rods. A power mechanism 20 of known type is operably coupled to the movable platen 18 for moving it on the tie rods toward and away from the stationary platen 16. The power mechanism 20 may be detachably connected as by means of bolts 22 to stripper support member 23 which in turn is coupled by bolts 23a to the movable platen 18 for actuation of the latter.

Mold sections 24, 24a are provided, with the mold sections being coupled to the respective platen as by means of bolts 26, to define a mold cavity adapted to receive moldable material therein when the mold sections are in mating relation. A plastic injection mechanism 28 of conventional type is adapted to coact with the stationary platen 16, and which may embody an injection nozzle 30 adapted to be received in opening 35 in the stationary platen 16, and into communication with the mold section 24a, for injecting moldable plastic material into the mold cavity defined by the mateable mold sections 24, 24a. Mold section 24a may include guide pins 36 thereon adapted for coaction with complementary openings 38 in the mold section 24, for guiding the mold sections into accurate mating coaction upon relative movement of the movable platen 18 toward the stationary platen 16.

Stripper mechanism 40 may be provided for pushing a molded article or articles from the mold section 24, upon opening of the mold sections. Stripper mechanism 40 may include stripper plate 42 mounted for reciprocal movement in a chamber 42a located in the movable platen 18, and with such plate having stripper members or fingers 44 secured thereto which are adapted to enter openings in mold section 24 upon opening of The mold. The stripper plate 42 may be connected to fluid powered double acting motor unit 52 which may be comprised of a cylinder chamber 48a located in the aforementioned stripper support member 23, and the piston and attached piston rod 52a connected to plate 42. It will be seen that application of fluid pressure to the left hand end of the piston chamber 48a will cause actuation of the stripper mechanism and force the molded articles from the mold section 24, and application of fluid pressure to the right hand end of piston chamber will cause retraction of the stripper mechanism.

In accordance with the invention, lubricating mechanism 54 is provided on the movable platen 18 for lubricating the sliding movement of platen 18 with respect to the guide way tie rods 12. As can be best seen in FIG. 2, sleeve-like bearings 56 are provided in each of openings 18a through the movable platen 18, with such spaced bearings 56 partially defining a substantially enlarged lubricant chamber or recess 58. Chamber 58 encircles the respective surface of the associated tie rod and is disposed in confronting relation to the surface thereof.

Communicating lubricant recess 58 with the exterior of platen 18 is a passageway 60 which may have a grease fitting 62 threaded thereinto for conveniently inserting solid type lubricant such as grease, into the receiving recess 58. The term grease as utilized herein means any conventional lubricant, from for instance the automotive, marine or industrial environments, or the like, and commonly comprising mixtures of mineral oils and/or fixed oils and soaps, and which may include various other additive compounds, for obtaining specific properties. The consistency of the grease used is preferably soft and butter-like at room temperatures.

While a soft, solid type lubricant is preferred, liquid lubricants having a sufficiently high viscosity are also suitable. For instance, lubricating oils having an S.A.E. rating of 30 or above would be generally acceptable for use in the mechanism of the invention. If a liquid lubricant is utilized, then a solid fitting such as a threaded plug may be used instead of the grease fitting 62.

Also communicating with recess 58 is another passageway 64 which has a closure such as threaded plug member 64a, threaded thereinto and which is adapted to retain the lubricant material or grease inserted into chamber 58 via passage 60. In the event that it is desirable or necessary to remove or replenish the lubricant in chamber 58, it can be conveniently done by removing plug 64a and inserting new grease or lubricant into the chamber 58 via passage 60.

Each bearing member 56 has a seal 66 coacting therewith, which seal may be formed of rubber or plastic or the like, for maintaining the lubricant in the bearings and in chamber 58, and which operates to wipe clean the exterior of the associated tie rod 12 during movement of the movable platen 18 along the tie rods. A removable retaining ring 68 may be utilized to retain each of the sealing members in position with respect to the respective bearing.

The seal illustrated is of the U-cup type, and may or may not have an O-ring included therewith. As shown in the drawings, the seal does not have an O-ring included therewith. The seal is assembled onto the respective tie rod and inserted into the counterbore of the associated bearing with the normally divergent lips of the seal engaging the opposing bearing and rod surface, and with the lips extending inwardly toward the lubricant recess. The seal is comparatively hard when assembled in the mechanism so as to provide a good wiping action on the exterior guide surface of the associated tie rod. A suitable type seal which has been found to provide especially good sealing and wiping characteristics is one identified as a Parker Type B Polypak Seal manufactured by Parker-Hanifin Corp. of Cleveland. In the molding machine illustrated, the movable platen is adapted to move or slide on the tie rods 12 at a rate of approximately 16 inches per second and the bearings 56 are adapted to have a sliding clearance fit of approximately 0.001 of an inch with respect to the respective tie rod. Bearings 56 are force fitted into the receiving opening 18a in the movable platen 18 for retention therewith, and engage in abutting relation with shoulders 69 in the respective opening. The length X of lubricant recess or chamber 58 is at least approximately one and one-half times the effective length Y of one of the associated bearings, and the exterior diameter Z of the recess is preferably approximately as great as the length X. The aforementioned effective length is the engaging or load bearing length of the bearing member and not necessarily the overall length of the bearing. Having the aforementioned length relationship between the lubricant recess 58 and the effective bearing length Y, insures adequate lubrication of the spaced bearings and sufficient lubricant in the chamber to enable lubrication operation of the bearings for a considerable period of time. It is believed that a single charge of lubricant completely filling the chamber 58 will have an average service life of at least 3 to 4 years in the injection molding machine environment illustrated. As the platen member 18 moves, for instance toward the right on rods 12, the film of lubricant between the bearings 56 and associated rod 12 provides for anti-frictional movement, while the mass or volume of lubricant in chamber 58 forces the lips of the left hand seals outwardly to wipe the associated rod clean and prevent loss of lubricant. With the tie rods 12 maintained clean, contamination of the product produced on the machine, from lubricant is expeditiously prevented.

From the foregoing description and accompanying drawings it will be seen that the invention provides a novel lubricating mechanism for lubricating relatively linearly movable members of a machine, and wherein the lubricating mechanism comprises a recess or chamber formed in one of the members and opening onto the other of the members and defined in part by spaced bearing means, and with sealing means coacting with the bearing means for retaining the lubricant in the bearings and in the recess of chamber and for wiping the surface of the supporting member clean during relative movement of the movable member on the supporting surface, and wherein the lubricating mechanism is relatively maintenance free and has a long service life for an initial installation of lubricant.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

What is claimed is:

1. A lubricating mechanism wherein one member moves generally linearly relative to another member, one of the members being guided on the other member, said other member being stationary relative to said one member and having an exterior, non-shielded guide surface, bearing means comprising spaced lengthwise extending bearing portions coacting between said members, said one of said members having a recess therein extending lengthwise of the other member and circumscribing the later, said recess being defined in part by said bearing portions, the length of said recess being greater than the effective bearing length of one or the other of said bearing portions, and passageway means communicating said recess with the exterior of the last mentioned one member for insertion of lubricant into said recess for lubricating the bearing means and movement of the movable member, said recess opening directly onto the guiding member for substantially the full length and transverse extent of said recess, and sealing means coacting with said bearing means for retaining the lubricant in said bearing means and said recess and wiping said surface of said other member clean of lubricant from said recess as the movable member moves away from said surface of the guiding member.

2. A lubricating mechanism in accordance with claim 1 including a lubricant fitting coacting with said passageway means.

3. A lubricating mechanism in accordance with claim 1 wherein said passageway means comprises spaced passageways communicating between said recess and the exterior of said last mentioned one member, and means for closing the exterior ends of the last mentioned passageways, one of the passageways being adapted for entry of lubricant into said recess for providing a supply of the lubricant in the recess while the other passageway being adapted for exiting of lubricant from said recess when it is desired to replace lubricant in the recess.

4. A lubricating mechanism in accordance with claim 1 wherein said bearing portions comprise a pair of spaced sleeve-like bearings having substantially equal effective bearing lengths and defining the ends of said recess in encompassing relation to said guiding member, the length of said recess being approximately three-fourths the total effective bearing length of said bearing means.

5. A lubricating mechanism in accordance with claim 4 wherein said guiding member is circular in transverse section and extends longitudinally, said sleeve-like bearings being cylindrical and encircling said guiding member in lengthwise slidable relation relative thereto, the inner confronting ends of said bearings defining the ends of said recess which encircles said guiding member, said sealing means being disposed adjacent the opposite end of each respective bearing.

6. A lubricating mechanism in accordance with claim 1 wherein said movable member is a reciprocal platen member of a molding machine and said guiding member comprises a tie rod of said machine on which said platen member is mounted.

7. A lubricating mechanism in accordance with claim 1 wherein said movable member has a passageway therethrough through which is received said guiding member, said passageway having spaced shoulders formed therein, said bearing portions each comprising a cylindrical sleeve-like bearing member encircling said guiding member, said bearing members being disposed in engaged relation with the respective of said shoulders at the inner ends of the bearing members, and said sealing means coacting with said bearing members adjacent the outer ends thereof.

8. A lubricating mechanism in accordance with claim 1 wherein said recess disposed intermediate said bearing portions is circular in transverse cross section, the length of said recess being approximately one and one-half times the effective bearing length of one of said bearing portions, the transverse dimension of said recess being substantially greater than the transverse dimension of said guiding member.

9. A lubricating mechanism in accordance with claim 1 wherein said sealing means comprises U-cup like seals coacting between said movable and said guiding members with the lips of said seals extending in a direction toward said recess.

10. A lubricating mechanism in accordance with claim 8 wherein said bearing portions are rigidly secured to said movable member and have a clearance fit of approximately one-thousandth of an inch on said guiding member.

11. A lubricating mechanism in accordance with claim 8 wherein the diameter of said recess is approximately the same dimension as the length of said recess.

12. A lubricating mechanism in accordance with claim 1 including a grease fitting coacting with said passageway means and accessible from the exterior of said one member for insertion of soft lubricant, such as grease, into said recess.

13. A lubricating mechanism for a molding machine wherein one member moves generally linearly relative to another member, one of the members being guided on an exterior guide surface of the other member, bearing means comprising spaced lengthwise extending bearing portions coacting between said members, one of said members having a recess therein extending lengthwise of the other member and circumscribing the latter, said recess being defined in part by said bearing portions, the length of said recess being greater than the effective bearing length of one of said bearing portions, passageway means communicating said recess with the exterior of the last mentioned one member for insertion of lubricant into said recess for lubricating the bearing means and movement of the movable member, said recess opening directly onto the guiding member for substantially the full length and transverse extent of said recess, sealing means coacting with said bearing means for retaining the lubricant in said bearing means and said recess and wiping said guiding member clean of lubricant from said recess as the movable member moves away from said guide surface of the guiding member, and wherein said movable member is a reciprocal platen member of the molding machine and said guiding member is a tie rod of said machine on which said platen member is mounted, said movable member being adapted to move on said guiding member at a rate of approximately 16 inches per second, said movable member being of block-like configuration and having a passageway adjacent each corner thereof through which is received a respective tie rod, each said passageway having spaced shoulders formed therein, said bearing portions received in the respective passageway comprising a pair of spaced cylindrical sleeve-like bearing members engaged in abutting relation with the respective of said shoulders therein, said recess being circular in transverse section and disposed intermediate the respective pair of said bearing members with the length of said recess being approximately one and one-half times the effective bearing length of one of said bearing members, each pair of said bearing members defining the ends of the respective recess, a grease fitting coacting with said passageway means and accessible from the exterior of said movable member for insertion of soft lubricant into said recess, the diameter of said recess being substantially greater than the diameter of the associated tie rod whereby a considerable amount of lubricant is receivable in said recess, other passageway means extending from communication with each said recess to the exterior of said movable member, means closing the exterior end of said other passageway means, said closure means being adapted for removal for permitting replacement of the lubricant in the respective recess, the diameter of each said recess being approximately the same dimension as the length of said recess, said lubricating mechanism providing for maintenance free, long service life lubrication to the movement of said platen with respect to the tie rods.

* * * * *